United States Patent
Minamikawa et al.

(10) Patent No.: US 9,614,992 B2
(45) Date of Patent: Apr. 4, 2017

(54) FUNCTION EXECUTION APPARATUS, SYSTEM, AND COMPUTER-READABLE MEDIUM THEREFOR

(71) Applicant: BROTHER KOGYO KABUSHIKI KAISHA, Nagoya, Aichi (JP)

(72) Inventors: Shunsuke Minamikawa, Aichi (JP); Masafumi Miyazawa, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 4 days.

(21) Appl. No.: 14/741,592

(22) Filed: Jun. 17, 2015

(65) Prior Publication Data
US 2015/0373211 A1    Dec. 24, 2015

(30) Foreign Application Priority Data
Jun. 19, 2014 (JP) ................ 2014-126079

(51) Int. Cl.
*G06F 15/00* (2006.01)
*H04N 1/00* (2006.01)

(52) U.S. Cl.
CPC ..... *H04N 1/00973* (2013.01); *H04N 1/00474* (2013.01)

(58) Field of Classification Search
CPC ............ H04N 1/0079; H04N 1/00129; H04N 1/00206; H04N 1/00244
USPC ...................................... 358/1.15
See application file for complete search history.

(56) References Cited

U.S. PATENT DOCUMENTS

| | | | | |
|---|---|---|---|---|
| 8,914,347 B2* | 12/2014 | Stienhans | ......... | G06F 17/30864 707/706 |
| 2009/0128844 A1* | 5/2009 | Kondo | ............... | H04N 1/00244 358/1.15 |
| 2011/0242592 A1* | 10/2011 | Tamura | .............. | H04N 1/00204 358/1.15 |
| 2011/0310431 A1 | 12/2011 | Uchikawa | | |

FOREIGN PATENT DOCUMENTS

JP      2012-004988 A      1/2012

* cited by examiner

*Primary Examiner* — Mark Milia
(74) *Attorney, Agent, or Firm* — Scully, Scott, Murphy & Presser, P.C.

(57) ABSTRACT

A function execution apparatus including a controller configured to receive an alert from a server, the alert indicating particular information about a function of the function execution apparatus, display a notification about the alert, receive the particular information from the server, in response to receiving a first operation to the notification, receive display information for displaying the particular information from the server, display the particular information in accordance with the display information, receive a second operation while the particular information is displayed, and in response to receiving the second operation, display a specific screen image, the specific screen image including a specific certain image for instructing the function execution apparatus to execute processing indicated by the particular information.

14 Claims, 12 Drawing Sheets

Figure 1:
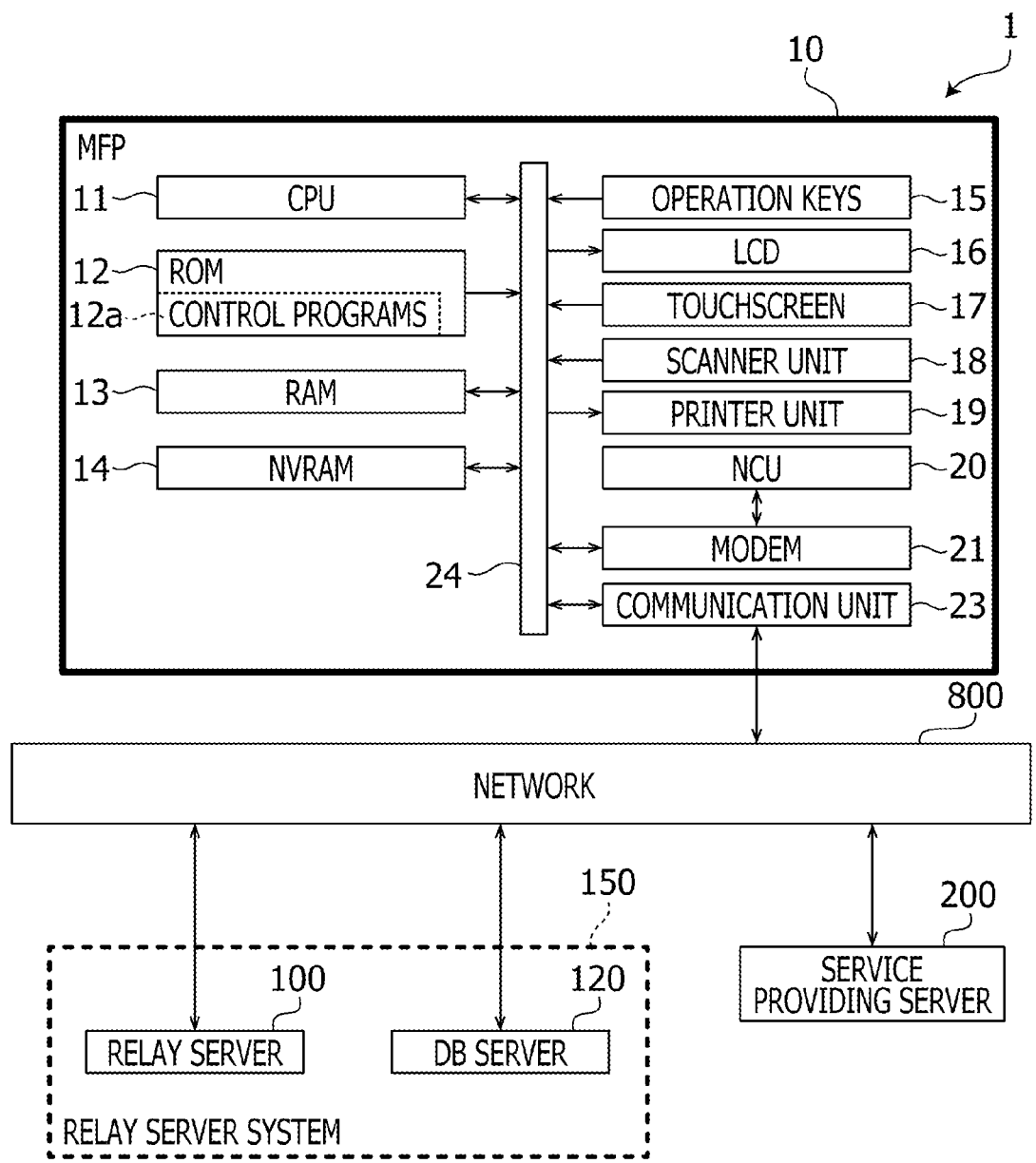

| NEW ARRIVAL ID (121a) | SIMPLE CHARACTER STRING (121b) | DETAIL CHARACTER STRING (121c) |
|---|---|---|
| 1 | NOTIFICATION OF NEW FUNCTION A | A new function A has been released. You can do ****. |
| 2 | NOTIFICATION OF NEW FUNCTION B | A new function B has been released. You can do ****. |
| 3 | NOTIFICATION OF NEW FUNCTION C | A new function C has been released. You can do ****. |
| 4 | NOTIFICATION OF NEW FUNCTION D | A new function D has been released. You can do ****. |
| ⋮ | ⋮ | ⋮ |

121

FIG. 2A

| MODEL NAME (122a) | NEW ARRIVAL ID (122b) | TRANSITION DESTINATION INFORMATION (122c) |
|---|---|---|
| MFP-J1000 | 1 | A ICON |
|  | 3 | C ICON |
| MFP-J3000 | 1 | E ICON |
|  | 4 | D ICON |
| MFP-J5000 | 1 | F ICON |
|  | 2 | B ICON |
|  | 3 | CLOUD SCREEN ID: X |
|  | 4 | CLOUD SCREEN ID: Y |
| ⋮ | ⋮ | ⋮ |

122

122c1 (A ICON, C ICON rows)
122c2 (CLOUD SCREEN ID: X, CLOUD SCREEN ID: Y rows)

FIG. 2B

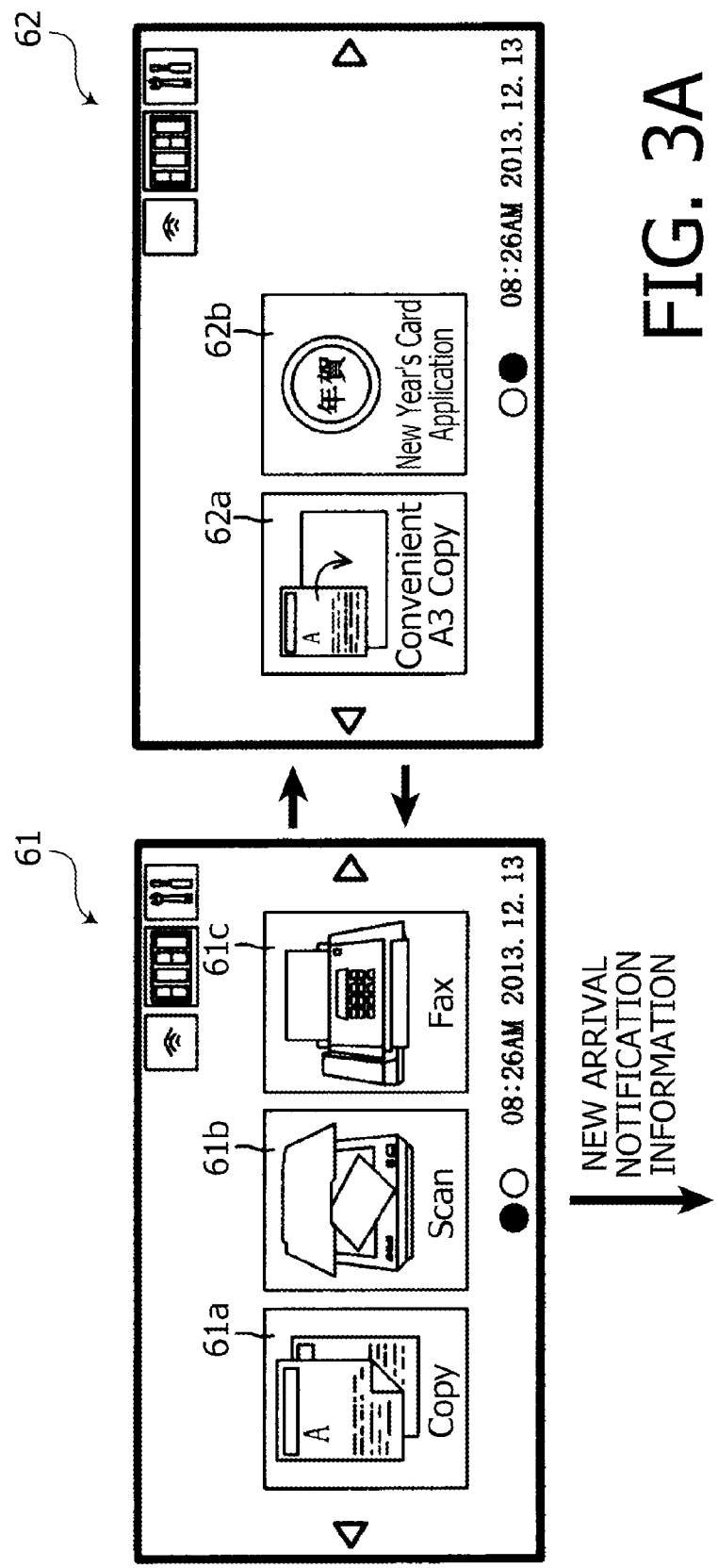

FROM FIG. 3A

TAPPING DETAIL KEY

TO FIG. 3C

FROM FIG. 3B

TAPPING OK KEY

TO FIG. 3D

FUNCTION EXECUTION APPARATUS, SYSTEM, AND COMPUTER-READABLE MEDIUM THEREFOR

CROSS-REFERENCE TO RELATED APPLICATION

This application claims priority under 35 U.S.C. §119 from Japanese Patent Application No. 2014-126079 filed on Jun. 19, 2014. The entire subject matter of the application is incorporated herein by reference.

BACKGROUND

Technical Field

The following description relates to one or more aspects of a function execution apparatus, a system, and a computer-readable medium therefor.

Related Art

An image processing apparatus has been known that is configured to provide, as applications available thereon, internal applications stored therein and external applications stored in an external device. Further, the known image processing apparatus is provided with a web browser configured to display, on a display, operation screens for the external applications.

Further, the web browser is configured to manage history information. The history information represents a display history of operation screens displayed on the display. The display history includes a history of operation screens for the internal applications displayed before the screen on the display is switched to an operation screen for an external application. On each operation screen for the external applications, a "Back" button is provided that is for making a transition to previously-displayed operation screens.

In response to the "Back" button being pressed, the web browser referrers to the display history and causes the display to display a previously-displayed operation screen. Therefore, when the previously-displayed operation screen is an operation screen for an internal application, the web browser causes the display to display the operation screen for the internal application.

SUMMARY

According to the known technique, transition destination screens to be displayed in response to the "Back" button being pressed are limited to previously-displayed screens. Therefore, there might be a previously-displayed screen that is inappropriate as a transition destination screen to be displayed in response to the "Back" button being pressed. Suppose, for instance, that the screen displayed by the web browser is a screen for displaying a notification received from the external device. In this case, if the transition destination screen to be displayed in response to the "Back" button being pressed is a screen having no connection with the notification, it might be required to perform a separate operation to display a relevant screen.

Aspects of the present disclosure are advantageous to provide one or more improved techniques, for a function execution apparatus, which make it possible to display a screen suitable for a notification received from an external device when a predetermined operation is performed for the received notification.

According to aspects of the present disclosure, a function execution apparatus is provided, which includes a communication unit configured to communicate with one or more servers via a network, a display, a storage configured to store a plurality of screen images displayable on the display, each screen image including one or more certain images, each certain image being for instructing the function execution apparatus to execute corresponding processing, and a controller configured to receive an alert from a server via the communication unit, the alert indicating that there exists particular information to be notified about a function executable by the function execution apparatus, control the display to display a notification indicating that the alert has been received, receive the particular information from the server via the communication unit, receive a first operation to the notification displayed on the display, in response to receiving the first operation, receive display information for displaying the particular information from the server via the communication unit, control the display to display the particular information in accordance with the received display information, receive a second operation while the particular information is displayed on the display, and in response to receiving the second operation, control the display to display a specific screen image, the specific screen image being one of the plurality of screen images stored in the storage, the specific screen image including a specific certain image for instructing the function execution apparatus to execute processing indicated by the particular information.

According to aspects of the present disclosure, further provided is a system including the function execution apparatus, and the one or more servers configured to communicate with the function execution apparatus via the network, the controller of the function execution apparatus being further configured to set an operation mode of the function execution apparatus to an external operation mode prior to the receipt of the display information, the external operation mode being a mode in which the function execution apparatus performs operations in accordance with information received from the server, and transmit model identification information for identifying a model of the function execution apparatus, to the server via the communication unit, the one or more servers being configured to receive the model identification information from the function execution apparatus, when the specific certain image, which is associated with the received model identification information and the particular information, exists among the certain images included in the screen images displayable on the function execution apparatus, acquire certain image identification information for identifying the specific certain image associated with the received model identification information and the particular information, and transmit the acquired certain image identification information to the function execution apparatus, the controller of the function execution apparatus being further configured to, in response to receiving the certain image identification information from the server after receiving the second operation while the particular information is displayed, terminate the external operation mode, and in response to terminating the external operation mode, control the display to display the specific screen image including the specific certain image identified by the certain image identification information, the one or more servers being further configured to, when the specific certain image, which is associated with the received model identification information and the particular information, does not exist among the certain images included in the screen images displayable on the function execution apparatus, acquire screen image identification information for identifying a second specific screen image of screen images managed by the server, the second specific screen image including a second specific certain image for instructing the function execution apparatus to execute processing corresponding to the particular information, and transmit, to the function execution apparatus, a screen image display information for instructing the function execution apparatus to display the second specific screen image based on the screen image identification information, the controller of the function execution apparatus being further configured to, in response to receiving the screen image display information from the server after receiving the second operation while the particular information is displayed, control the display to display the second specific screen image including the second specific certain image in accordance with the received screen image display information, without terminating the external operation mode.

According to aspects of the present disclosure, further provided is a non-transitory computer-readable medium storing computer-readable instructions that are executable by one or more processors coupled with a function execution apparatus including a communication unit configured to communicate with one or more servers via a network, a display, and a storage configured to store a plurality of screen images displayable on the display, each screen image including one or more certain images, each certain image being for instructing the function execution apparatus to execute corresponding processing, the instructions being configured to, when executed by the one or more processors, cause the one or more processors to receive an alert from a server via the communication unit, the alert indicating that there exists particular information to be notified about a function executable by the function execution apparatus, control the display to display a notification indicating that the alert has been received, receive the particular information from the server via the communication unit, receive a first operation to the notification displayed on the display, in response to receiving the first operation, receive display information for displaying the particular information from the server via the communication unit, control the display to display the particular information in accordance with the received display information, receive a second operation while the particular information is displayed on the display, and in response to receiving the second operation, control the display to display a specific screen image, the specific screen image being one of the plurality of screen images stored in the storage, the specific screen image including a specific certain image for instructing the function execution apparatus to execute processing indicated by the particular information.

BRIEF DESCRIPTION OF THE ACCOMPANYING DRAWINGS

FIG. 1 is a block diagram schematically showing a whole configuration of a system in accordance with one or more aspects of the present disclosure.

FIG. 2A exemplifies contents registered in a new-arrival-information database in accordance with one or more aspects of the present disclosure.

FIG. 2B exemplifies contents registered in a transition destination information database in accordance with one or more aspects of the present disclosure.

FIGS. 3A to 3D exemplify a screen transition sequence for illustrating a first illustrative embodiment according to one or more aspects of the present disclosure.

Figure 4:
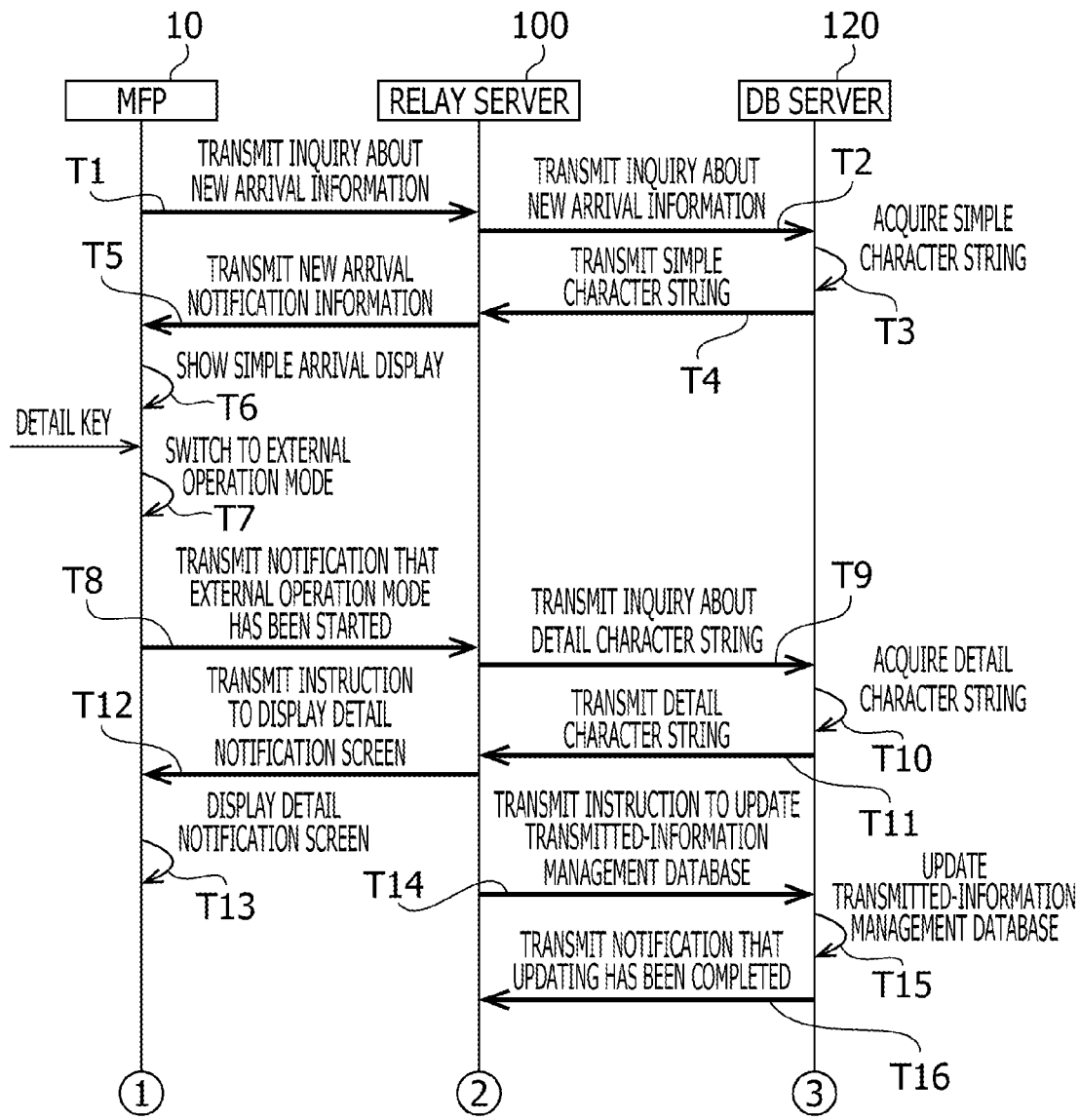
Figure 5A:
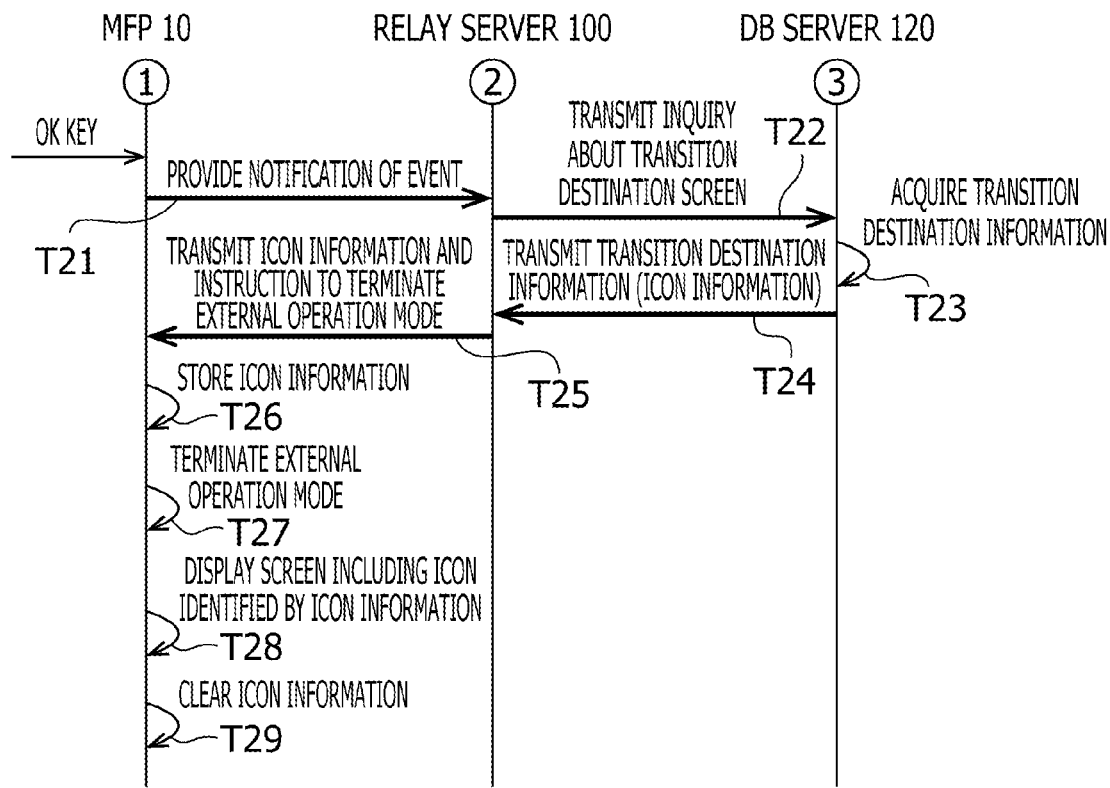
Figure 5B:
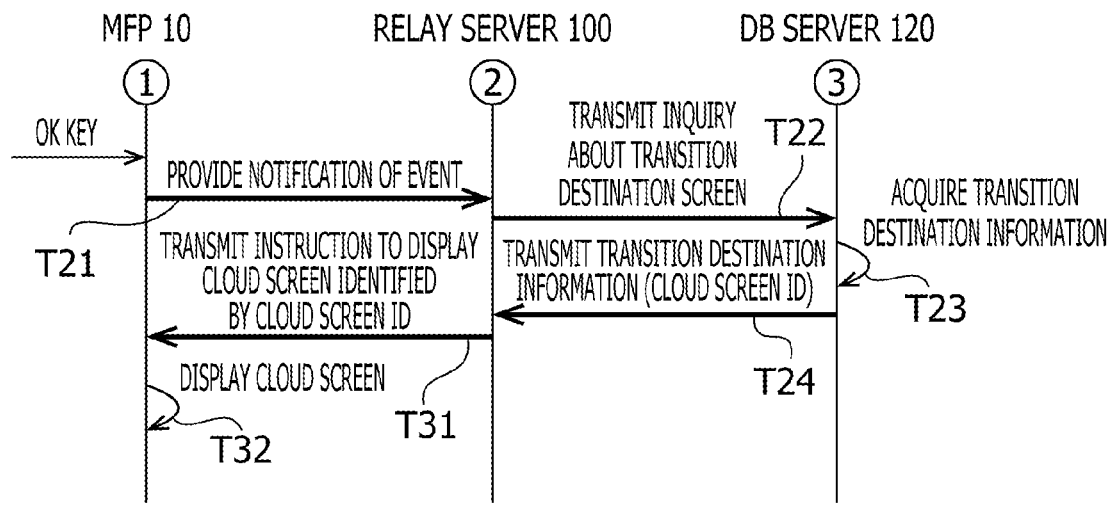
Figure 6A:
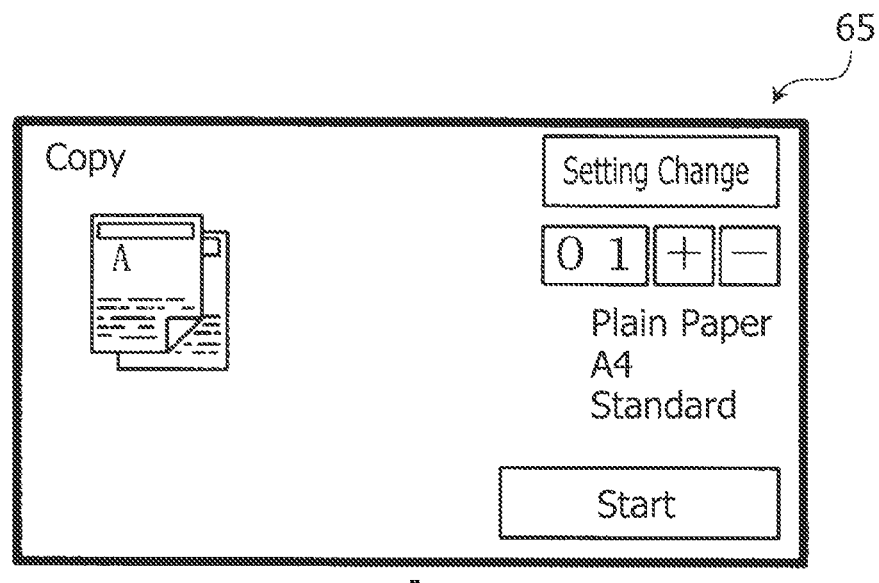
Figure 6B:
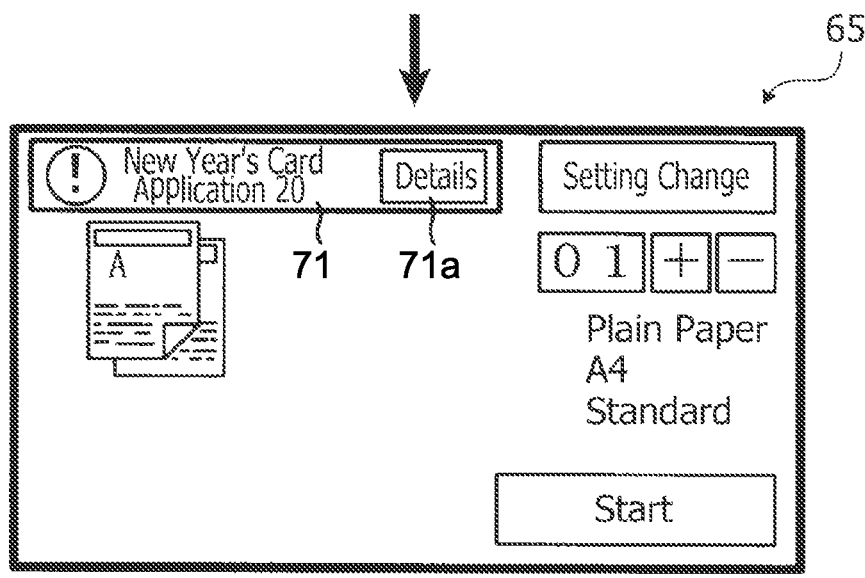
Figure 6C:
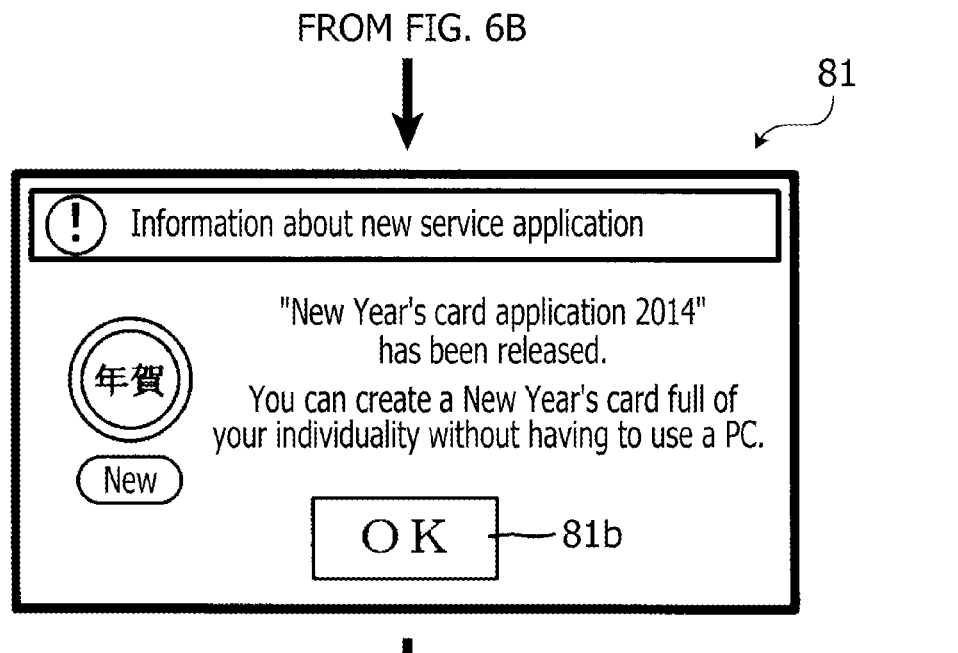
Figure 6D:
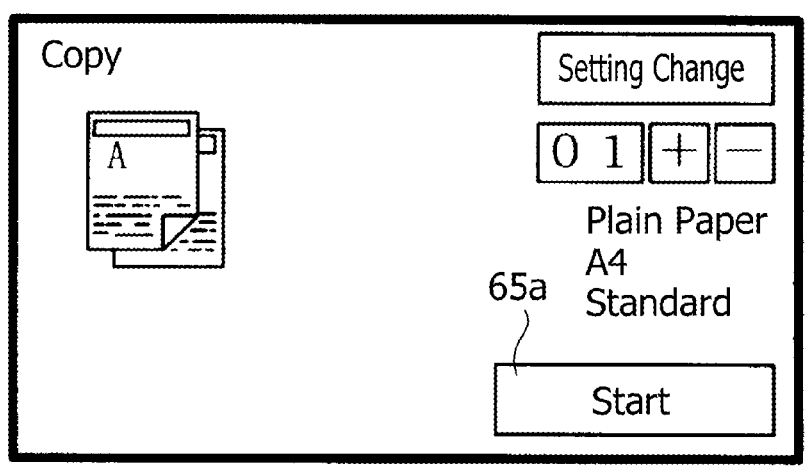
Figure 6E:
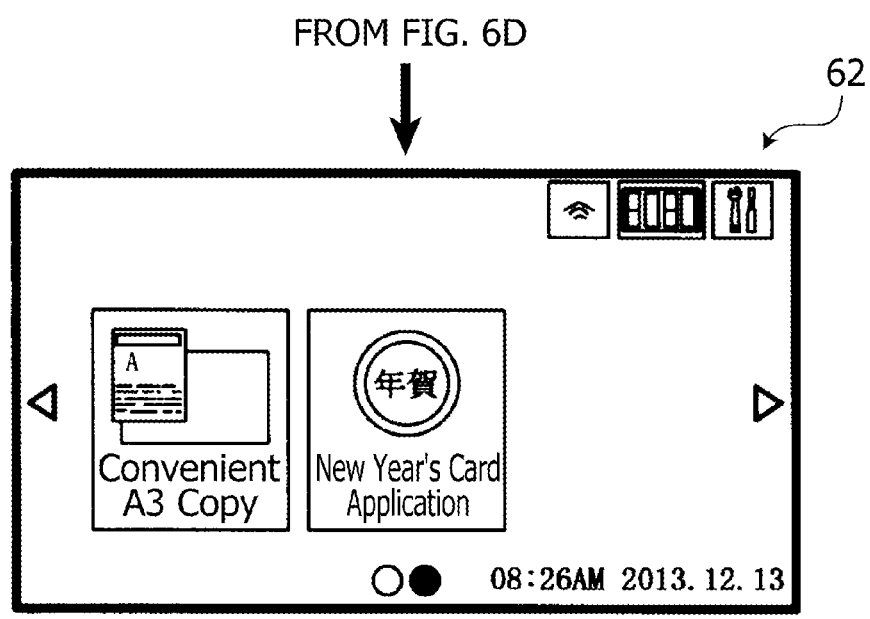

FIGS. 4, 5A, and 5B exemplify a sequence of operations by the system including a multi-function peripheral (MFP), a relay server, and a DB server, in accordance with one or more aspects of the present disclosure.

FIGS. 6A to 6E exemplify a screen transition sequence for illustrating a second illustrative embodiment according to one or more aspects of the present disclosure.

Figure 7A:
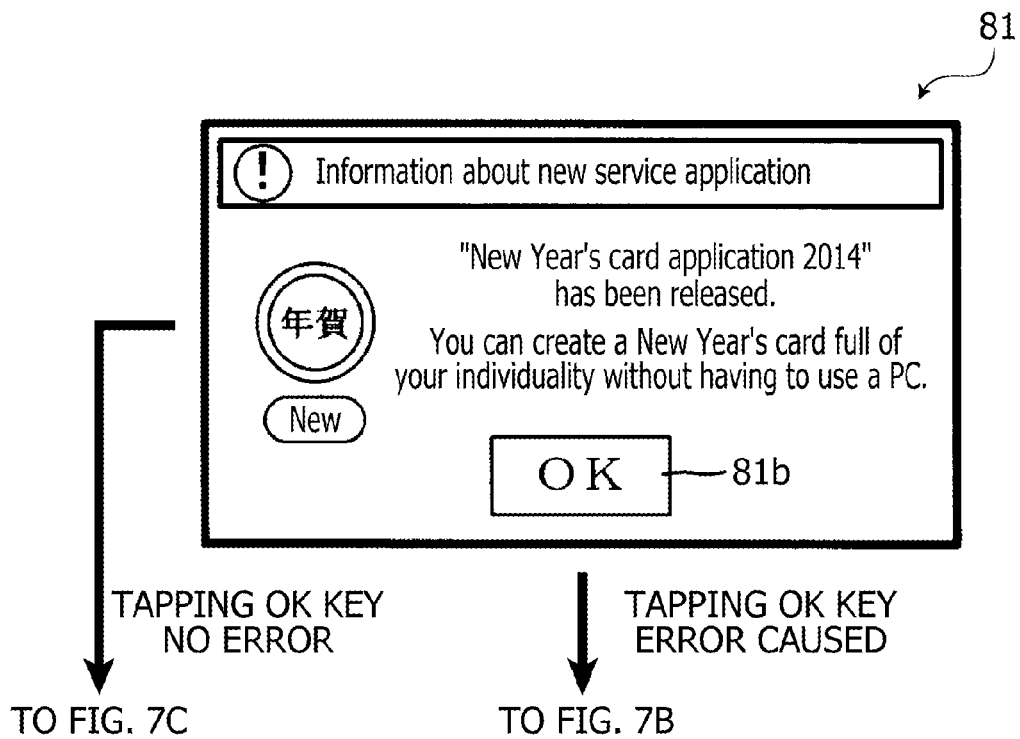
Figure 7B:
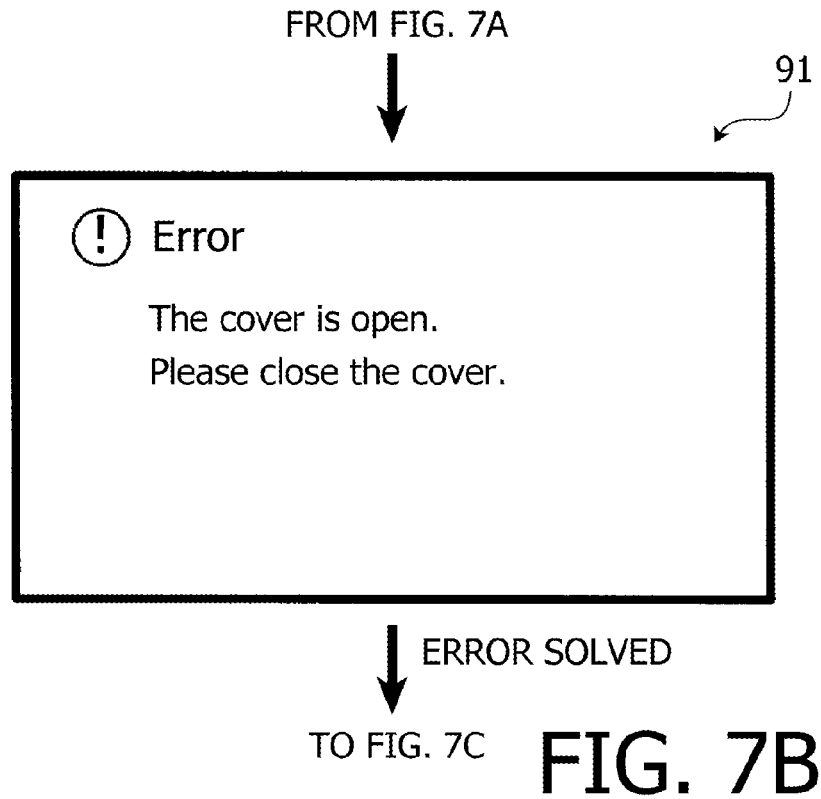
Figure 7C:
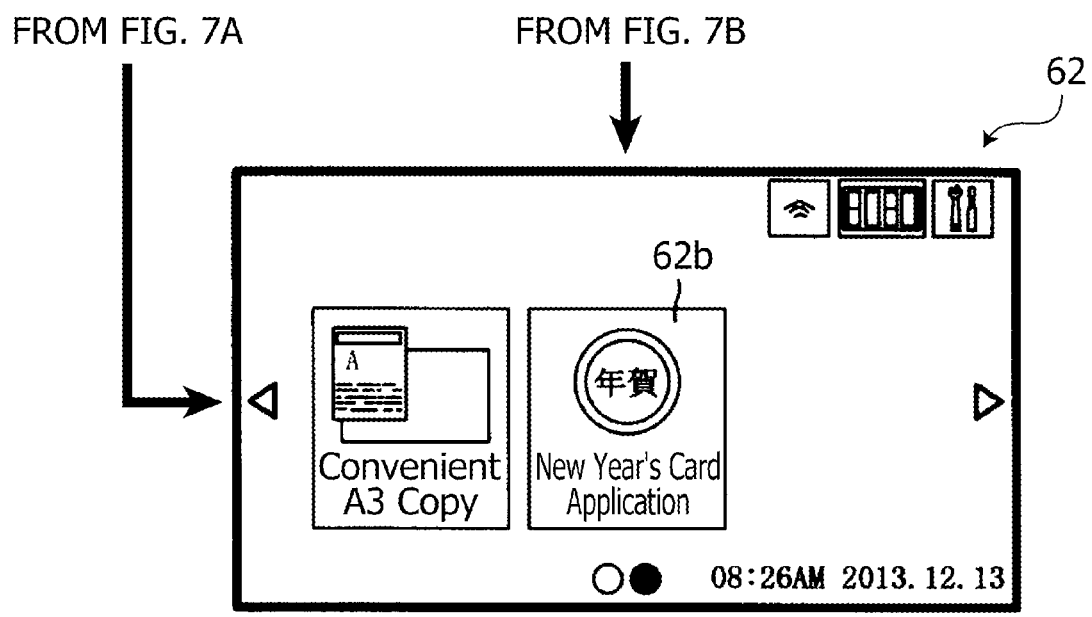

FIGS. 7A to 7C exemplify a screen transition sequence for illustrating a second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings. First, referring to FIGS. 1 to 5, a first illustrative embodiment will be described. FIG. 1 is a block diagram exemplifying a whole configuration of a system 1 in the first illustrative embodiment. The system 1 is a service cooperation system that includes a multi-function peripheral 10 (hereinafter referred to as an "MFP 10" in an abbreviated form). In the system 1, the MFP 10 receives various services from a service providing server 200 in cooperation with a relay server system 150.

The system 1 includes the MFP 10, a relay server 100, a database server 120 (hereinafter, which may be referred to as a "DB server 120"), and the service providing server 200. The relay server 100 and the DB server 120 form the relay server system 150. In the system 1, the MFP 10, the relay server 100, the DB server 120, and the service providing server 200 are communicably connected with each other via a network 800. The network 800 may be, for instance, the Internet.

In the system 1, data communication between the MFP 10 and the relay server 100 is performed, e.g., in accordance with a connection-establishing-type protocol, more specifically, an XMPP over BOSH. It is noted that the XMPP over BOSH is an abbreviated form of "Extensible Messaging and Presence Protocol Over Bidirectional-Streams Over Synchronous HTTP." On the other hand, data communication between the MFP 10 and the service providing server 200 is performed, e.g., in accordance with an HTTP. Further, data communication between the relay server 100 and the DB server 120 is performed, e.g., in accordance with an HTTP.

In the system 1, the service providing server 200 is a server provided by a service provider. The service providing server 200 provides various kinds of services to clients such as the MFP 10. The services provided by the service providing server 200 include a service that allows the clients to download image data from the service providing server 200. Therefore, the MFP 10 is allowed to print image data downloaded from the service providing server 200, with a printing function of the MFP 10.

The relay server 100 is configured to manage various services to be used by the MFP 10 as a client. Further, the relay server 100 manages a screen image (hereinafter, which may be simply referred to as a "screen") to be displayed on an LCD 16 of the MFP 10 when the MFP 10 receives a service from the service providing server 200 or when the MFP 10 provides particular information to be notified about a service provided by the service providing server 200. The relay server 100 transmits to the MFP 10 an instruction depending on a situation. Further, the relay server 100 causes the LCD 16 to display a screen according to the instruction on a display area thereof, or causes a printer unit 19 or a communication unit 23 of the MFP 10 to execute a function according to the instruction.

The DB server 120 is configured to manage a database used by the relay server 100. The DB server 120 stores a new-arrival-information database 121 (see FIG. 2A) and a transition destination information database 122 (see FIG. 2B). The databases 121 and 122 will be described later with reference to FIGS. 2A and 2B.

Each of the relay server 100, the DB server 120, and the service providing server 200 has only to have known server functions. In the first illustrative embodiment, each of the relay server 100, the DB server 120, and the service providing server 200 will be described as a single physically-existing server. In this regard, nonetheless, each of the relay server 100, the DB server 120, and the service providing server 200 may be a virtual machine formed by a plurality of physical apparatuses that work in cooperation with each other and serve as a single server.

The MFP 10 has various functions such as the printing function, a scanning function, and a copy function. The MFP 10 includes a CPU 11, a ROM 12, a RAM 13, an NVRAM 14, operation keys 15, the LCD 16, a touchscreen 17, a scanner unit 18, the printer unit 19, an NCU 20, a modem 21, and a wireless communication unit 23. The above elements included in the MFP 10 are interconnected via an input/output port 24.

The CPU 11 is configured to control each function of the MFP 10 and control each element connected with the input/output port 24 in accordance with programs and data stored in at least one of the ROM 12, the RAM 13, and the NVRAM 14. The ROM 12 is a read-only memory configured to store various programs executable by the CPU 11, and constant numbers and tables to be referred to when the CPU 11 executes the programs. For instance, the ROM 12 stores control programs 12a for controlling operations of the MFP 10. Operations to be performed by the MFP 10 in each of below-mentioned sequences shown in FIGS. 4, 5A, and 5B are operations to be executed by the CPU 11 in accordance with the control programs 12a.

The RAM 13 is a rewritable volatile memory that has a temporary area for temporarily storing various sorts of data when the CPU 11 executes the control programs 12a. The NVRAM 14 is a non-volatile RAM. The operation keys 15 are mechanical keys provided to a housing of the MFP 10. The operation keys 15 are configured to accept various kinds of setting values and instructions from a user. The LCD 16 is a liquid crystal display device configured to display various screens. The touchscreen 17 is provided on a top surface of the LCD 16. The touchscreen 17 is configured to detect a position where an indication body (such as a finger and a stylus) contacts or is close to a screen surface of the LCD 16, and to transmit information on the detected position to the MFP 10.

The scanner unit 18 is configured to read an image of a document sheet and convert the read image into image data. The printer unit 19 is configured to form an image based on image data on a recording sheet. The modem 21 is configured to modulate image data to be transmitted via facsimile communication, to a signal transmittable via a telephone network (not shown), and transmit the signal via the NCU 20. Further, the modem 21 is configured to demodulate a signal received from the telephone network via the NCU 20, to image data. The NCU 20 is configured to connect the MFP 10 with the telephone network (not shown). Further, the NCU 20 is configured to control the state of connection between the MFP 10 and the telephone network by closing or disconnecting the telephone network in accordance with instructions from the modem 21. The communication unit 23 is configured to achieve communication with other devices connected with the network 800. For instance, the communication unit 23 may be a known network card.

In the first illustrative embodiment, as will be described later in detail, when receiving particular information to be notified from the relay server 100, the MFP 10 displays on the LCD 16 a notification screen (e.g., a detail notification screen 81 shown in FIG. 3C) including the received particular information shown thereon. Then, when accepting an operation representing that the notification screen has been confirmed, the MFP 10 displays a screen depending on the particular information received from the relay server 100. Therefore, it is user-friendly that there is no need to perform any operation to separately cause the MFP 10 to display a screen suitable for the particular information after confirming the notification screen.

FIG. 2A schematically shows an example of contents registered in the new-arrival-information database 121 stored in the DB server 120. The new-arrival-information database 121 is a database for managing particular information of which the clients (such as the MFP 10) included in the system 1 should be notified. In the first illustrative embodiment, the particular information to be notified is information on a newly available service (hereinafter referred to as a "new arrival service") for the MFP 10.

In the new-arrival-information database 121, a new arrival ID 121a is associated with a simple character string 121b and a detail character string 121c. The new arrival ID 121a is an identification number for identifying each individual piece of information (hereinafter referred to as "new arrival information") on the new arrival service. The simple character string 121b is a character string that simply represents contents of the new arrival information. The detail character string 121c is a character string that represents the contents of the new arrival information in detail.

When a notification of new arrival information has been generated, an administrator of the relay server system 150 inputs a simple character string 121b and a detail character string 121c into the DB server 120. The DB server 120 assigns a new arrival ID 121a to the simple character string 121b and the detail character string 121c. Then, the DB server 120 stores, into the new-arrival-information database 121, the simple character string 121b and the detail character string 121c with the new arrival ID 121a assigned thereto.

FIG. 2B schematically shows an example of contents registered in the transition destination information database 122 stored in the DB server 120. In the transition destination information database 122, each individual model (model name) of the MFP 10 is associated with information for identifying a transition destination screen to be displayed after the notification screen including the new arrival information is confirmed on the MFP 10.

Specifically, in the transition destination information database 122, each model name 122a of the MFP 10 is associated with a new arrival ID 122b and transition destination information 122c. The model name 122a is information for identifying a model (type) of the MFP 10. The new arrival ID 122*b* is an identification number for individually identifying each individual piece of new arrival information. The transition destination information 122*c* is information for identifying a transition destination screen to be displayed after the notification screen is confirmed on the MFP 10.

In the first illustrative embodiment, when the MFP 10 identified by the model name 122*a* is a model of MFP that is allowed to use an icon associated with the new arrival service, the transition destination information 122*c* is information (hereinafter referred to as "icon information") for identifying the icon. For instance, "A ICON" indicated by reference characters "122*c*1" is an example of the icon information.

Meanwhile, when the MFP 10 identified by the model name 122*a* is a model of MFP that is allowed to use the icon associated with the new arrival service, the transition destination information 122*c* is an identification number (hereinafter referred to as a "cloud screen ID") for identifying a cloud screen including an icon associated with use of the new arrival service, of cloud screens managed by the relay server 100. The "cloud screen" is a screen for making a service provided by the service providing server 200 available on the MFP 10. The "cloud screen" is a screen managed by the relay server 100. For instance, "CLOUD SCREEN ID: X" indicated by reference characters "122*c*2" is an example of the cloud screen ID for the cloud screen including the icon associated with use of the new arrival service.

When a notification of the new arrival information has been generated, the administrator of the relay server system 150 inputs into the DB server 120 a model name 122*a* and a transition destination information 122*c* together with the simple character string 121*b* and the detail character string 121*c*. The DB server 120 stores, into the transition destination database 122, the input model name 122*a* in association with transition destination information destination 122*c* and a new arrival ID 122*b* that is identical to a number assigned as the new arrival ID 121*a*.

Referring to FIGS. 3A to 3D, a general overview of the present disclosure will be described. Screens 61 and 62 are standby screens to be displayed in a display area on the LCD 16. Each screen 61 and 62 is not a screen to be displayed in response to an instruction from the relay server 100 but a screen to be displayed under display control by the MFP 10. Therefore, each screen 61 and 62 is allowed to be displayed even in a situation where communication with the relay server 100 is not available. The MFP 10 switches and displays the screens 61 and 62 in response to a predetermined switching operation.

The NVRAM 14 stores therein image data for displaying each of screens (including the screens 61 and 62) that are displayable under display control by the MFP 10 independently of the relay server 100. The screens displayable independently of the relay server 100 are configured hierarchically. In that hierarchical configuration, the standby screens 61 and 62 are positioned at the highest hierarchical level.

The screen 61 includes three sorts of icons 61*a*, 61*b*, and 61*c* shown thereon. For instance, the icon 61*a* is an icon for issuing an instruction to start the copy function of the MFP 10. Meanwhile, the screen 62 includes two sorts of icons 62*a* and 62*b*. For instance, the icon 62*b* is an icon for issuing an instruction to execute a New-Year's-card application. The New-Year's-card application is for achieving a New-Year's-card service provided by the service providing server 200. The New-Year's-card service is a service related to creation and printing of New Year's cards. It is noted that the New-Year's-card application is an external application to be executed by the service providing server 200 that provides the New-Year's-card service.

In the first illustrative embodiment, the MFP 10 periodically (e.g., every 12 hours) inquires of the relay server 100 about whether there is new arrival information. When receiving information (hereinafter referred to as "new arrival notification information") representing that there is new arrival information as a replay to the inquiry, the MFP 10 shows a display 71 (hereinafter referred to as a "simple new arrival display 71") that provides a simple notification of the new arrival information on a currently displayed screen. In the example shown in FIGS. 3A to 3D, since the MFP 10 has received the new arrival notification information while being displaying the screen 61, the simple new arrival display 71 is displayed on the screen 61.

The simple new arrival display 71 includes a character string for simply describing the contents of the new arrival information, and a detail key 71*a*. The character string for simply describing the contents of the new arrival information is the simple character string 121*b* contained in the received new arrival notification information. The detail key 71*a* is a key for issuing a request for details about the new arrival information to the relay server 100.

In the first illustrative embodiment, when accepting an operation of tapping the detail key 71*a*, the MFP 10 switches an operation mode thereof to an external operation mode, and transmits an external operation starting notification to the relay server 100. The "external operation mode" is a mode in which the MFP 10 performs operations according to instructions received from external servers such as the relay server 100 and the service providing server 200. In response to switching the operation mode to the external operation mode, the MFP 10 is allowed to display on the LCD 16 the detail notification screen 81 to provide a detailed notification of the new arrival information, in accordance with an instruction received from the relay server 100.

The detail notification screen 81 is a screen for providing a detailed notification of contents of the new arrival information. Unlike the screen 61, the detail notification screen 81 is configured to be displayed in response to an instruction from the relay server 100. The detail notification screen 81 includes a message 81*a* and an OK key 81*b*. The message 81*a* includes the detail character string 121*c* contained in the received instruction. The OK key 81*b* is a key for indicating that the contents of the detail notification screen 81 has been confirmed.

In the first illustrative embodiment, in response to receipt of an operation of tapping the OK key 81*b*, the MFP 10 transmits to the relay server 100 an event representing that the OK key 81 *b* has been operated. The relay server 100, which has received the event, transmits to the MFP an instruction to cause the LCD 16 to display a screen including the icon associated with use of the new arrival service. Consequently, the MFP 10 displays on the LCD 16 a screen including the icon associated with use of the new arrival service.

In the example shown in FIGS. 3A to 3D, the detail notification screen 81 is a screen related to the new arrival New-Year's-card service. Therefore, the icon associated with use of the new arrival service, which the user is notified of by the detail notification screen 81, is the icon 62*b* for issuing an instruction to execute the New-Year's-card application. Hence, in the example, in response to the OK key 81*b* being tapped, the screen 62 including the icon 62*b* is displayed on the LCD 16. Thus, according to the first illustrative embodiment, it is possible to use the new arrival service (i.e., the New-Year's-card service) that the user has been notified of by the detail notification screen 81, immediately after the OK key 81*b* is operated.

FIGS. 4, 5A, and 5B are sequence diagrams showing examples of a sequence of operations by the MFP 10, the relay server 100, and the DB server 120 when the MFP 10 receives new arrival information from the relay server 100. The MFP 10 periodically (e.g., every 12 hours) transmits to the relay server 100 an inquiry as to whether there is new arrival information (T1). In transmission of the inquiry in T1, the MFP 10 sends a MAC address thereof and a model name indicating a model thereof as information for identifying the MFP 10, to the relay server 100.

The relay server 100, which has received the inquiry from the MFP 10, transmits the MAC address and the model name received along with the inquiry, to the DB server 120. At this time, the relay server 100 sends to the DB server 120 an inquiry as to whether there is unsent new arrival information that has not been transmitted to the MFP 10 identified by the MAC address and the model name (T2).

The DB server 120, which has received the inquiry from the relay server 100, first refers to the transition destination database 122, and determines whether there is a new arrival ID 122*b* associated with the received model name 122*a*. When determining that there is a new arrival ID 122*b* associated with the received model name 122*a*, the DB server 120 determines whether the new arrival information identified by the new arrival ID 122*b* is unsent new arrival information that has not been transmitted to the MFP 10 identified by the received MAC address.

The determination is made by reference to a transmitted-information management database (not shown) stored in the DB server 120. In the transmitted-information management database, the MAC address, the model name, the new arrival ID, and transmitted information representing that new arrival information identified by the new arrival ID has been transmitted to the MFP 10 are associated with each other. As will be described later in detail, in response to an instruction to cause the LCD 16 to display the detail notification screen 81 being transmitted from the relay server 10 to the MFP 10, the new arrival ID and the transmitted information corresponding to the target new arrival information are stored into the transmitted-information management database in association with the MAC address and the model name corresponding to the target MFP 10. Therefore, when the new arrival ID, which is associated with the received model name in the transition destination database 122, is not associated with the received MAC address and the received model name in the transmitted-information management database, the new arrival information corresponding to the new arrival ID is unsent new arrival information that has not been transmitted to the MFP 10 identified by the received MAC address.

Figure 3B:
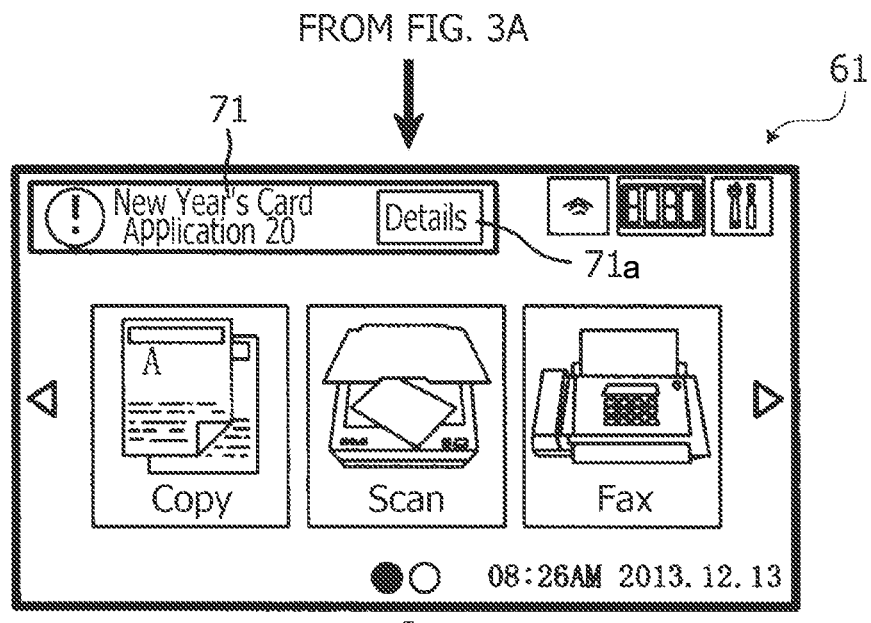

When determining that there is unsent new arrival information, the DB server 120 acquires the simple character string 121*b* associated with the new arrival ID 121*a* representing the unsent new arrival information, with reference to the new arrival information database 121 (T3). The DB server 120 transmits to the relay server 100 the acquired simple character string and the new arrival ID representing the unsent new arrival information (T4). The relay server 100 transmits an alert along with new arrival notification information to the MFP 10 (T5). The new arrival notification information includes the simple character string and the new arrival ID that the relay server 100 has received from the DB server 120 in T4. In response to receipt of the alert, the MFP 10 shows a simple new arrival display 71 on the LCD 16 (T6). The simple new arrival display 71 includes the simple character string received as a part of the new arrival notification information. As a result of the operation in T6, for instance, as shown in FIG. 3B, the simple new arrival display 71 is shown on the screen 61.

When accepting an operation of tapping the detail key 71*a*, the MFP 10 switches the operation mode thereof from a regular operation mode to the external operation mode (T7). The "regular operation mode" is a mode in which the MFP 10 performs operations in accordance with control by the MFP 10 independently of the external servers. The MFP 10 transmits to the relay server 100 a notification (hereinafter referred to as an "external operation starting notification") representing that the MFP 10 has switched the operation mode thereof to the external operation mode (T8). In T8, along with the external operation starting notification, the MFP 10 transmits, to the relay server 100, the MAC address, the model name, the new arrival ID received in T5, and information representing that the operation of tapping to the detail key 71*a* was a trigger for switching the operation mode of the MFP 10.

The relay server 100, which has received the external operation starting notification, transmits, to the DB server 120, the new arrival ID received along with the external operation starting notification, and an inquiry about a detail character string corresponding to the new arrival ID (T9). The DB server 120, which has received the inquiry from the relay server 100, refers to the new arrival information database 121, and acquires the detail character string 121*c* associated with the new arrival ID 121*a* received along with the inquiry (T10). The DB server 120 transmits, to the relay server 100, the acquired detail character string and the new arrival ID received in T10 (T11).

Figure 3C:
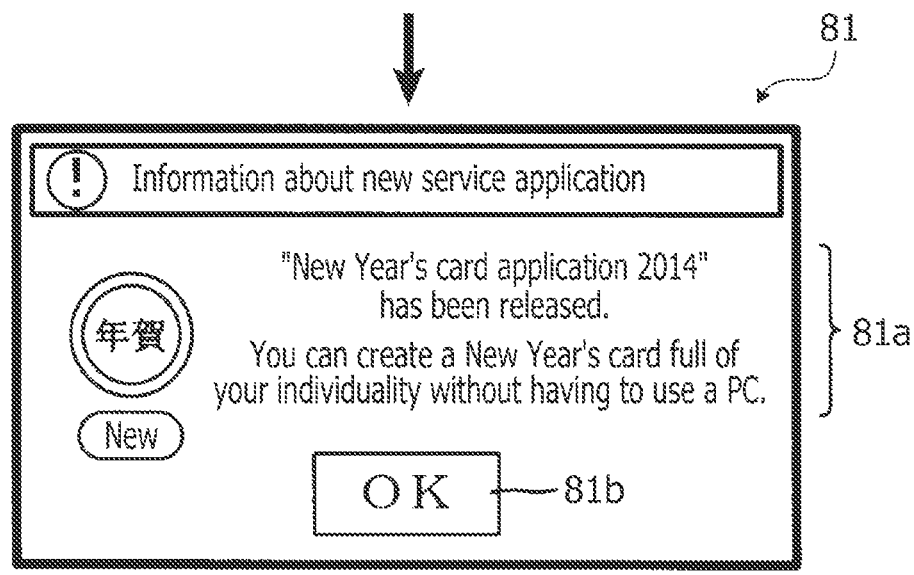
Figure 3D:
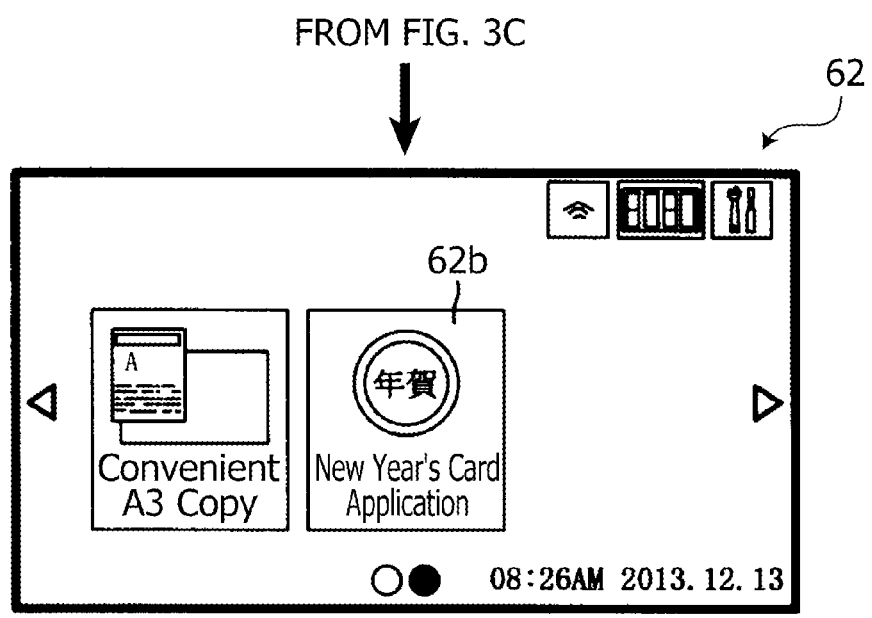

The relay server 100 transmits, to the MFP 10, an instruction to cause the LCD 16 to display the detail notification screen 81 (T12). The instruction transmitted in T12 includes the detail character string received from the DB server 120 and display information specifying a template of the screen. In the case of the detail notification screen 81, the display information specifying the template of the screen includes information that the detail notification screen 81 is a message type screen and information that the detail notification screen 81 displays the OK key 81*b*. It is noted that the detail character string may be transmitted to the MFP 10, separately from the display information. For instance, the detail character string may be transmitted to the MFP 10 along with the new arrival notification information in T5. According to the received instruction, the MFP 10 displays, on the LDC 16, the message 81*a* including the received detail character string, and the detail notification screen 81 including the OK key 81*b* (T13). As a result of the operation in T13, for instance, the detail notification screen 81 as shown in FIG. 3C is displayed on the LCD 16.

In response to transmission of the instruction to the MFP 10 in T12, the relay server 100 transmits to the DB server 120 a transmitted-information management database updating construction (i.e., an instruction to update the transmitted-information management database) (T14). In T14, the relay server 100 transmits, to the DB server 120, the MAC address, the model name, and the new arrival ID corresponding to the new arrival information that is to be treated as transmitted information after this, together with the transmitted-information management database updating instruction. The DB server 120 updates the transmitted-information management database in accordance with each piece of information received in T14 (T15). The DB server 120 transmits to the relay server 100 a notification representing that the updating has been completed (T16).

As shown in FIG. 5A, when accepting the operation of tapping the OK key 81b on the detail notification screen 81 displayed on the LCD 16 in T13, the MFP 10 provides to the relay server 100 a notification of an event that has occurred in response to the OK key 81b being tapped, together with the MAC address, the model name, and the new arrival ID (T21). The relay server 100, which has received the notification of the event, transmits, to the DB server 120, the MAC address, the model name, and the new arrival ID received along with the notification of the event, and an inquiry about a transition destination screen corresponding to these pieces of transmitted information (T22).

The DB server 120, which has received the inquiry from the relay server 100, refers to the transition destination database 122, and acquires the transition destination information 122c associated with the model name 122a and the new arrival ID 122b received along with the inquiry (T23). The DB server 120 transmits the transition destination information acquired in T23 to the relay server 100 (T24). In the example shown in FIG. 5A, the transition destination information acquired by the DB server 120 in T23 is icon information. Therefore, in the example, the DB server 120 transmits the icon information as the transition destination information in T24.

When the transition destination information that the relay server 100 has received from the DB server 120 is the icon information, the relay server 100 transmits to the MFP 10 an instruction to terminate the external operation mode (T25). In T25, the relay server 100 transmits, to the MFP 10, the transition destination information (i.e., the icon information) received from the DB server 120, together with the instruction. The MFP 10 stores the icon information received from the relay server 100 into a predetermined area of the RAM 13 (T26). The MFP 10 terminates the external operation mode in accordance with the instruction received from the relay server 100 (T27). As a result of the operation in T27, the MFP 10 is brought into the regular operation mode, and thereby performs operations in accordance with control by the MFP 10 independently of the external servers.

The MFP 10 refers to a screen table (not shown), and searches for the icon information stored into the RAM 13 in T26, i.e., a screen including an icon corresponding to the icon information received from the relay server 100. On the screen table, each screen to be displayed on the LCD 16 in the regular operation mode is associated with one or more icons included in each screen. The screen table is stored in the NVRAM 14. The MFP 10 displays on the LCD 16 a screen including an icon corresponding to the received icon information (T28). In the example shown in FIGS. 3A to 3D, as a result of the operation in T28, the display on the LCD 16 is switched from the detail notification screen 81 to the screen 62. It is noted that the screen table includes a screen ID associated with each individual screen. Further, on the screen table, each screen ID is associated with one or more icon IDs that are respectively associated with one or more icons displayed on the corresponding screen. The MFP 10 displays on the LCD 16 a screen including an icon that is associated, on the screen table, with an icon ID corresponding to the received icon information. Therefore, in the example shown in FIGS. 3A to 3D, the MFP 10 does not display the screen 61 but displays the screen 62 on the LCD 16. After T28, icon information is cleared (T29).

FIG. 5B shows an example where the transition destination information acquired by the DB server 120 in T23 is not icon information but a cloud screen ID. In the sequence chart shown in FIG. 5B, operations in T21 to T24 are the same as described above except for that the transition destination information is a cloud screen ID.

In T24, when the transition destination information that the relay server 100 has received from the DB server 120 is a cloud screen ID, the relay server 100 transmits, to the MFP 10, an instruction to cause the LCD 16 to display a cloud screen, identified by the received cloud screen ID, of screens managed by the relay server 100 (T31). The instruction transmitted from the relay server 100 to the MFP 10 may contain the transition destination information (i.e., the cloud screen ID). The MFP 10 displays the cloud screen according to the received instruction (T32).

The cloud screen ID that the DB server 120 has acquired in T23 is a cloud screen ID of a cloud screen including the icon associated with use of the new arrival service. Therefore, in the example shown in FIG. 5B, the cloud screen including the icon associated with use of the new arrival service, of cloud screens managed by the relay server 100, is displayed on the LCD 16.

According to the first illustrative embodiment, when the operation of tapping the OK key 81b on the detail notification screen 81 is performed, the icon associated with use of the new arrival service (i.e., the screen including the icon according to the notification provided by the detail notification screen 81) is displayed. Therefore, it is possible to prevent such a situation that a screen having no connection with the notification provided by the detail notification screen 81 is displayed in response to the OK key 81b being tapped. Hence, it is user-friendly that there is no need to separately perform a troublesome operation to display a screen according to the notification provided by the detail notification screen 81.

Further, when the MFP 10 is a model of MFP that is not allowed to use the icon associated with use of the new arrival service, i.e., when the icon associated with use of the new arrival service does not exist on the MFP 10, the MFP 10 is allowed to display a screen including the icon associated with use of the new arrival service in accordance with the instruction received from the relay server 100. Thus, it is possible to avoid a situation where the MFP 10 is not allowed to execute a function corresponding to the particular information to be notified depending on the model of the MFP 10.

Subsequently, referring to FIGS. 6A to 6E, an explanation will be provided of a second illustrative embodiment according to aspects of the present disclosure. In the aforementioned first illustrative embodiment, the specific case has been described in which the MFP 10 receives the new arrival notification information from the relay server 100 in the situation where the standby screen 61 positioned at the highest hierarchical level is displayed on the LCD 16, among the screens displayable under display control by the MFP 10 independently of the relay server 100. In the second illustrative embodiment, a case is considered in which the MFP 10 receives new arrival notification information from the relay server 100 in a situation where a screen positioned at a lower hierarchical level than the standby screens is displayed on the LCD 16. In the second illustrative embodiment, substantially the same elements as those of the first illustrative embodiment will be provided with the same reference characters, and explanations thereof will be omitted.

A screen 65 is a copy screen to be displayed in response to an operation of tapping the icon 61a of the icons 61a to 61c included in the standby screen 61. Namely, the screen 65 is positioned at a lower hierarchical level than the screen 65.

When the MFP 10 receives new arrival notification information while the screen 65 is being displayed, the MFP 10 shows the simple new arrival display 71 on the screen 65.

When the MFP 10 accepts an operation of tapping the detail key 71a, the apparatuses 10, 100, and 120 perform the operations T7 to T16 in the same manner as the first illustrative embodiment. As a result of the operation in T13, the MFP 10 displays the detail notification screen 81 on the LCD 16 in accordance with the instruction received from the relay server 100. When the MFP 10 accepts an operation of tapping the OK key 81b, the apparatuses 10, 100, and 120 perform the operations T21 to T24 in the same manner as the first illustrative embodiment.

When the transition destination information acquired by the DB server 120 in T23 is the cloud screen ID, the apparatuses 10, 100, and 120 perform the operations in T31 and T32. Namely, when the icon associated with use of the new arrival service does not exist on the MFP 10, the MFP 10 displays the cloud screen corresponding to the cloud screen ID as being still in the external operation mode.

Meanwhile, when the transition destination information acquired by the DB server 120 in T23 is the icon information, the apparatuses 10 and 100 perform the operations in T25 to T27 in the same manner as the first illustrative embodiment. In the second illustrative embodiment, when a previous screen is positioned at a lower hierarchical level than the standby screens 61 and 62, the MFP 10 terminates the external operation mode in T27, and thereafter, displays the previous screen on the LCD 16 without executing the operation in T28. It is noted that the previous screen is a screen that was displayed on the LCD 16 until immediately before the detail notification screen 81 is displayed on the LCD 16. Therefore, in the example shown in FIGS. 6A to 6E, when the external operation mode is terminated in T27, the screen 65 (i.e., the previous screen) is displayed on the LCD 16.

After the previous screen is displayed in response to the OK key 8 lb being tapped, the MFP 10 performs the operation in T28 in response to receipt of an operation for causing the LCD 16 to display a screen positioned at a higher hierarchical level than the previous screen. Specifically, in T28, the MFP 10 displays on the LCD 16 the screen including the icon corresponding to the icon information received from the relay server 100. Hence, in the example shown in FIGS. 6A to 6E, the MFP 10 displays the screen 62 on the LCD 16 in response to receipt of the operation for causing the LCD 16 to display a screen positioned at a higher hierarchical level than the previous screen.

As the aforementioned operation for causing the LCD 16 to display a screen positioned at a higher hierarchical level than the previous screen (i.e., the screen that was displayed until immediately before the detail notification screen 81 is displayed on the LCD 16), for instance, an operation of pressing or tapping a HOME key for causing the LCD 16 to display a standby screen may be exemplified. The HOME key may be one of the operation keys 15. Alternatively, the HOME key may be a softkey displayed on the LCD 16. Furthermore, as the operation for causing the LCD 16 to display a screen positioned at a higher hierarchical level than the previous screen, an operation for backing to a screen positioned at a hierarchical level one-level higher than the previous screen may be exemplified.

In the second illustrative embodiment, the MFP 10 displays a standby screen once a single function such as the copy function and the scanning function is completed. Therefore, an operation for executing a function related to the previous screen (i.e., the screen that was displayed until immediately before the detail notification screen 81 is displayed on the LCD 16) may be exemplified as the operation for causing the LCD 16 to display a screen positioned at a higher hierarchical level than the previous screen.

In the example shown in FIGS. 6A to 6E, the previous screen is the copy screen 65. Therefore, an operation for executing the copy function (e.g., an operation of tapping a start key 65a) corresponds to the aforementioned operation for causing the LCD 16 to display a screen positioned at a higher hierarchical level than the previous screen. When a start key for beginning to execute the copy function is present on a specific screen positioned at a lower hierarchical level than the previous screen (i.e., the screen 65), an operation of tapping the start key on the specific screen corresponds to the aforementioned operation for causing the LCD 16 to display a screen positioned at a higher hierarchical level than the previous screen. When the operation for causing the LCD 16 to display a screen positioned at a higher hierarchical level than the previous screen is a function-executing operation for executing a function related to the previous screen, the MFP 10 performs the operation in T28 after completion of the function executed in response to the function-executing operation. Namely, in the example shown in FIGS. 6A to 6E, the MFP 10 performs the operation in T28 after completion of the copy function.

According to the second illustrative embodiment, the MFP 10 receives the new arrival notification information from the relay server 100 in a situation where a screen positioned at a lower hierarchical level than the standby screens is displayed on the LCD 16, and then, in response to the OK key 81b being tapped on the detail notification screen 81, the MFP 10 displays the previous screen (i.e., the screen that was displayed until immediately before the detail notification screen 81 is displayed on the LCD 16). In the situation where the LCD 16 is caused to display a screen positioned at a lower hierarchical level than the standby screens, the user possibly has an intention to execute a corresponding function via the screen. Thus, the MFP 10 displays on the LCD 16 the previous screen (i.e., the screen that was displayed until immediately before the detail notification screen 81 is displayed on the LCD 16), in response to receipt of the operation of tapping the OK key 81b. Accordingly, the user is allowed to preferentially use an intended function.

Subsequently, referring to FIGS. 7A to 7C, an explanation will be provided of a third illustrative embodiment according to aspects of the present disclosure. In the third illustrative embodiment, an error that has occurred in the MFP 10 is considered. In the third illustrative embodiment, substantially the same elements as those of the first illustrative embodiment will be provided with the same reference characters, and explanations thereof will be omitted.

In the case where the icon associated with use of the new arrival service exists on the MFP 10, when there is not any error caused in the MFP 10 at a point of time when the MFP 10 accepts the operation of tapping the OK key 81b, the apparatuses 10, 100, and 120 perform the operations in T21 to T29 in the same manner as the first illustrative embodiment. Therefore, in the example shown in FIGS. 3A to 3D, the screen 62 is displayed on the LCD 16 in the OK key 81b being tapped.

Meanwhile, when there is an error caused in the MFP 10 at a point of time when the MFP 10 accepts the operation of tapping the OK key 81b, the apparatuses 10, 100, and 120 perform the operations in T21 to T27, and thereafter, the MFP 10 displays on the LCD 16 a screen 91 including information on the error (such as information as to what kind of error has occurred), without executing the operation in T28. The screen 91 is a screen that the MFP 10 is allowed to display independently of the relay server 100. Then, the MFP 10 performs the operation in T28 in response to the error being solved. Thus, in the example shown in FIGS. 7A to 7C, the screen 62 is displayed on the LCD 16 in response to the error being solved.

On the other hand, in the case where the icon associated with use of the new arrival service does not exist on the MFP 10, when there is not any error caused in the MFP 10 at a point of time when the MFP 10 accepts the operation of tapping the OK key 81b, the apparatuses 10, 100, and 120 perform the operations in T31 and T32 in the same manner as the first illustrative embodiment.

Meanwhile, when there is an error caused in the MFP 10 at a point of time when the MFP 10 accepts the operation of tapping the OK key 81b, in T21, the MFP 10 transmits to the relay server 100 information representing that an error is occurring, together with a notification of an event that has occurred in response to the OK key 81b being tapped. The relay server 100, which has received the information representing that an error is occurring, transmits to the MFP 10 an instruction to cause the LCD 16 to display a screen that is substantially the same as the screen 91, without executing the operation in T22. Thereby, the MFP 10 displays on the LCD 16 a screen that is substantially the same as the screen 91. After that, when the error has been solved, the MFP 10 transmits to the relay server 100 information representing that the error has been solved. The relay server 100, which has received the information, performs the operation in T22. Thereafter, the apparatuses 10, 100, and 120 perform the operations in T23 to T29.

According to the third illustrative embodiment, when the OK key 81b is operated during a period of time when an error is occurring, a screen related to the error is displayed. Thereafter, in response to the error being solved, a screen including the icon associated with use of the new arrival service is displayed. Thus, it is possible to avoid delay in solving the error, and thus prevent occurrence of malfunction in execution of an intended function.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

In the aforementioned illustrative embodiments, the MFP 10 has been exemplified as a function execution apparatus. Nonetheless, various kinds of apparatuses having a display may be employed as function execution apparatuses. For instance, a single-function printer, a single-function image scanner, and a personal computer and a smartphone having a storage configured to store downloaded data may be employed as function execution apparatuses.

In the aforementioned illustrative embodiments, the relay server 100 and the DB server 120 are separate servers. Nonetheless, aspects of the present disclosure may be applied to a system including a server provided with both the function of the relay server 100 and the function of the DB server 120. Further, in the aforementioned illustrative embodiments, the system 1 includes a single MFP (i.e., the MFP 10). However, the system 1 may include a plurality of MFPs.

In the aforementioned illustrative embodiments, using the icon information received from the relay server 100, the MFP 10 searches for a screen including an icon corresponding to the icon information as a screen to be displayed (i.e., as a screen corresponding to the particular information to be notified). Nonetheless, the MFP 10 may be configured to search for a screen to be displayed, using other information instead of the icon information. For example, the MFP 10 may be configured to search for a screen to be displayed, using the simple character string or the detail character string received from the relay server 100. In this case, for instance, the MFP 10 may be configured to identify a corresponding icon based on the simple character string or the detail character string and search for a screen including the identified icon as a screen to be displayed.

The aforementioned illustrative embodiments have exemplified the case where a new service has been added as the new arrival service to the New-Year's-card service actualized by the New-Year's-card application. Nonetheless, a service that has not existed may newly be added as the new arrival service. Further, in the aforementioned illustrative embodiments, the information on the new arrival service provided by the service providing server 200 has been exemplified as the particular information to be notified. For instance, the particular information to be notified may be information about a function that has newly become available on the MFP 10 in response to firmware installed in the MFP 10 being updated.

In the aforementioned illustrative embodiments, the transition destination database 122 is configured to store the icon information for identifying the icon associated with use of the new arrival service as the transition destination information 122c, in association with a model of MFP that is allowed to use the icon associated with use of the new arrival service. Instead of the icon information, the transition destination database 122 may store screen identifying information for identifying a screen including the icon associated with use of the new arrival service, as the transition destination information 122c. In this case, for instance, the MFP 10 may be configured to receive the screen identifying information as the transition destination information from the relay server 100 and display a screen identified by the received screen identifying information, as the screen corresponding to the particular information to be notified.

In the aforementioned illustrative embodiments, the transition destination database 122 is configured to store the cloud screen ID as the transition destination information 122c, in association with a model of MFP that is not allowed to use the icon associated with use of the new arrival service. Nonetheless, instead of the cloud screen ID, the transition destination database 122 may store information representing that the MFP 10 is a model of MFP that is not allowed to use the icon associated with use of the new arrival service as the transition destination information 122c. In this case, for instance, instead of the operation in T32, the relay server 100 may transmit to the MFP 10 the information representing that the MFP 10 is a model of MFP that is not allowed to use the icon associated with use of the new arrival service, along with an instruction to terminate the external operation mode. In response to receipt of the information along with the instruction, the MFP 10 may terminate the external operation mode and display on the LCD 16 the previous screen (i.e., the screen that was displayed until immediately before the detail notification screen 81 is displayed on the LCD 16).

In the aforementioned first illustrative embodiment, in FIGS. 3A to 3D, the specific case has been exemplified in which the screen 61 displayed when the MFP 10 has received the new arrival information, and the screen 62 that is the transition destination screen are positioned at the same hierarchical level (i.e., the highest hierarchical level for the standby screens). Nonetheless, the screen that is the transition destination screen may be positioned at a lower hierarchical level than the standby screens. In this case, in T28, when causing the screen on the LCD 16 to make a transition to a screen (i.e., a transition destination screen) including the icon associated with use of the new arrival service, the MFP 10 may display the transition destination screen after sequentially displaying, as an animation, screen images of respective hierarchical levels from the standby screen to the transition destination screen. Thereby, the user is allowed to easily grasp the hierarchical level of the transition destination screen including the icon associated with use of the new arrival service.

In the aforementioned first illustrative embodiment, the screen corresponding to the particular information to be notified is displayed in response to the OK key 81b being tapped on the detail notification screen 81. Meanwhile, when a so-called "Back" key for backing to the last-displayed previous screen, of the operation keys 15, is tapped instead of the OK key 81b while the detail notification screen 81 is being displayed, the display on the LCD 16 may not be switched to the screen corresponding to the particular information to be notified, but switched back to a standby screen.

In the aforementioned second illustrative embodiment, after the MFP 10 has received the new arrival notification information from the relay server 100 in a situation where a screen positioned at a lower hierarchical level than the standby screens is displayed on the LCD 16, in response to the OK key 81b being tapped on the detail notification screen 81, the MFP 10 displays the previous screen (i.e., the screen that was displayed until immediately before the detail notification screen 81 is displayed on the LCD 16). Instead of this configuration, in the same manner as the first illustrative embodiment, the MFP 10 may be configured to display a screen including the icon associated with use of the new arrival service in response to the OK key 81b being tapped on the detail notification screen 81.

In the aforementioned second illustrative embodiment, when the icon associated with use of the new arrival service does not exist on the MFP 10, the MFP 10 displays the cloud screen corresponding to the cloud screen ID in response to the OK key 81 being tapped. Nonetheless, the MFP 10 may be configured to, in response to the OK key 81 being tapped, display the previous screen (i.e., the screen that was displayed until immediately before the detail notification screen 81 is displayed on the LCD 16), even when the icon associated with use of the new arrival service does not exist on the MFP 10.

In this case, for instance, when the relay server 100 has received the cloud screen ID as the transition destination information in T24, the relay server 100 may suspend transmission of the instruction based on the received cloud screen ID in T31. The relay server 100 may transmit the instruction to terminate the external operation mode to the MFP 10, in the same manner as when the icon associated with use of the new arrival service exists on the MFP 10. The MFP 10 may terminate the external operation mode in accordance with the received instruction, and thereafter may display on the LCD 16 the previous screen (i.e., the screen that was displayed until immediately before the detail notification screen 81 is displayed on the LCD 16). Then, the MFP 10 may switch the operation mode to the external operation mode in response to receipt of an operation for causing the LCD 16 to display a screen positioned at a higher hierarchical level than the previous screen, and may transmit the external operation starting notification to the relay server 100. In response to receipt of the external operation starting notification, the relay server 100 may perform the once-suspended transmission of the instruction to cause the LCD 16 to display a screen corresponding to the received cloud screen ID to the MFP 10.

In the aforementioned third illustrative embodiment, when the icon associated with use of the new arrival service does not exist on the MFP 10, the MFP 10 displays on the LCD 16 a screen including information on the error in accordance with the instruction received from the relay server 100. Instead of this configuration, the MFP 10 may be configured to display the screen 91 in the same manner as when the icon associated with use of the new arrival service exists on the MFP 10. In this case, for instance, the screen 91 may be the screen displayed after the MFP 10 has terminated the external operation mode as exemplified in the aforementioned modification of the second illustrative embodiment. Further, in this case, the MFP 10 may switch the operation mode to the external operation mode in response to the error being solved.

In the aforementioned illustrative embodiments, the MFP 10 transmits to the relay server 100 an inquiry as to whether there is new arrival information, and thereby receives the new arrival notification information from the relay server 100. Nonetheless, the relay server 100 may unilaterally transmit the new arrival notification information to the MFP 10. In this case, for instance, the DB server 120 may store the MAC address and the model name previously registered from the MFP 10. Further, the relay server 100 may identify the MAC address of the model name associated with the new arrival ID for the new arrival service to be newly notified. The relay server 100 may transmit the new arrival notification information to the MFP 10 corresponding to the identified MAC address.

In the aforementioned illustrative embodiments, the relay server 100 is configured to transmit the icon information to the MFP 10 in response to receipt of the event from the MFP 10 in T21. Nonetheless, the relay server 100 may be configured to transmit the icon information in accordance with different timing. For instance, the relay server 100 may be configured to transmit the icon information together with the new arrival notification information in T5. In this case, for instance, when determining that there is unsent new arrival information in response to the inquiry received in T2, the DB server 120 may acquire the icon information and transmit to the relay server 100 the icon information along with the simple character string. Meanwhile, the MFP 10 may store into the RAM 13 the icon information received along with the new arrival notification information, and thereafter may use the icon information in order to search for a screen including the icon associated with use of the new arrival service.

In the aforementioned illustrative embodiments, the MFP 10 is configured to receive the detail character string from the relay server 100 in response to the detail key 71*a* included in the simple new arrival display 71 being operated. Nonetheless, the MFP 10 may be configured to receive the detail character string from the relay server 100 in accordance with different timing. For instance, the MFP 10 may be configured to receive the detail character string along with the new arrival notification information. Further, in the aforementioned illustrative embodiments, the detail notification screen 81 is a screen that the MFP 10 displays in accordance with the instruction received from the relay server 100. Nonetheless, the detail notification screen 81 may be a screen that the MFP 10 displays independently of the relay server 100. In this case, for instance, the MFP 10 may display the detail notification screen 81 even in an operation mode different from the external operation mode.

In the aforementioned illustrative embodiments, the MFP 10 is configured to receive the icon information from the relay server 100 in response to the OK key 81*b* being operated on the detail notification screen 81. Nonetheless, the MFP 10 may be configured to receive the icon information from the relay server 100 in accordance with different timing. For instance, the MFP 10 may be configured to receive the icon information from the relay server 100 in response to the detail key 71*a* included in the simple new arrival display 71 being operated. Specifically, for instance, after switching the operation mode of the MFP 10 from the regular operation mode to the external operation mode (T17), the MFP 10 may transmit to the relay server 100 a notification of an event caused in response to the detail key 71*a* being operated, along with the MAC address, the model name, and the new arrival ID (T21). Then, the apparatuses 10, 100, and 120 may perform the operation in T22 and the following operations.

In the aforementioned illustrative embodiments, each operation to be performed by the MFP 10, of the operations shown in FIGS. 4, 5A, and 5B, has been described as an operation to be executed by the CPU 11. Nonetheless, each operation to be performed by the MFP 10, of the operations shown in FIGS. 4, 5A, and 5B, may be executed by two or more CPUs in cooperation with each other. Alternatively, each operation to be performed by the MFP 10, of the operations shown in FIGS. 4, 5A, and 5B, may be executed by an IC such as an ASIC alone or by two or more ICs in cooperation with each other. Further, alternatively, each operation to be performed by the MFP 10, of the operations shown in FIGS. 4, 5A, and 5B, may be executed by the CPU 11 and one or more ICs such as ASICs in cooperation with each other.

What is claimed is:

1. A function execution apparatus comprising:
   a communication interface configured to communicate with at least a first server and a second server via a network, the second server being different from the first server;
   a display;
   a storage configured to store a plurality of screen images displayable on the display, each screen image including one or more certain images, each certain image being for instructing the function execution apparatus to execute corresponding processing; and
   a controller configured to:
     receive an alert from the first server via the communication interface, the alert indicating that there exists particular information to be notified about a newly available function that is provided by the second server, the newly available function being executable by the function execution apparatus;
     in response to receiving the alert, control the display to display a notification object indicating the existence of the particular information;
     receive a first operation of operating the notification object displayed on the display;
     in response to receiving the first operation, receive display information for displaying the particular information from the first server via the communication interface, the display information including the particular information;
     control the display to display the particular information in accordance with the received display information;
     receive a second operation input via the display while the particular information is displayed on the display;
     in response to receiving the second operation, transmit identification information for identifying the particular information to the first server via the communication interface;
     receive screen transition information from the first server via the communication interface; and
     in response to receiving the screen transition information, control the display to display a specific screen image based on the received screen transition information, the specific screen image being one of the plurality of screen images stored in the storage, the specific screen image including a specific certain image for instructing the function execution apparatus to execute processing indicated by the particular information.

2. The function execution apparatus according to claim 1, wherein the controller is further configured to:
   receive identification information from the first server via the communication interface, the identification information identifying the specific screen image including the specific certain image; and
   determine the specific screen image including the specific certain image based on the received identification information.

3. The function execution apparatus according to claim 2, wherein the identification information is to identify the specific certain image.

4. The function execution apparatus according to claim 1, wherein the plurality of screen images are configured hierarchically, and
   wherein the controller is further configured to, when the specific screen image is positioned at a lower hierarchical level than a predetermined screen image of the plurality of screen images, control the display to display the specific screen image after sequentially displaying screen images of respective hierarchical levels from the predetermined screen image to the specific screen image.

5. The function execution apparatus according to claim 1, wherein the plurality of screen images are configured hierarchically, and
   wherein the controller is further configured to:
     when the specific screen image is not positioned at a lower hierarchical level than a predetermined screen image of the plurality of screen images, control the display to display the specific screen image; and when the specific screen image is positioned at a lower hierarchical level than a predetermined screen image of the plurality of screen images, perform:
controlling the display to display a previous screen image without displaying the specific screen image, the previous screen image being a screen image that was displayed until immediately before the particular information is displayed on the display; and
thereafter, in response to receipt of an operation for displaying a screen image positioned at a higher hierarchical level than the previous screen, controlling the display to display the specific screen image.

6. The function execution apparatus according to claim 1, wherein the controller is further configured to:
in response to receiving the second operation while the particular information is displayed on the display in a situation where there is not an error caused in the function execution apparatus, control the display to display the specific screen image; and
in response to receiving the second operation while the particular information is displayed on the display in a situation where there is an error caused in the function execution apparatus, perform:
controlling the display to display a screen image related to the error without displaying the specific screen image; and
thereafter, in response to the error being solved, controlling the display to display the specific screen image.

7. The function execution apparatus according to claim 1, wherein the controller comprises:
one or more processors; and
a memory storing processor-executable instructions configured to, when executed by the one or more processors, cause the one or more processors to:
in response to receiving the first operation of operating the notification object displayed on the display, control the communication interface to receive the display information from the first server;
control the display to display the particular information in accordance with the received display information; and
in response to receiving the second operation while the particular information is displayed on the display, control the display to display the specific screen image including the specific certain image.

8. A system comprising:
the function execution apparatus according to claim 1; and
the at least the first and second servers configured to communicate with the function execution apparatus via the network,
wherein the controller of the function execution apparatus is further configured to:
set an operation mode of the function execution apparatus to an external operation mode prior to the receipt of the display information, the external operation mode being a mode in which the function execution apparatus performs operations in accordance with information received from the first server; and
transmit model identification information for identifying a model of the function execution apparatus, to the first server via the communication interface, wherein the first server is configured to:
receive the model identification information from the function execution apparatus;
when the specific certain image, which is associated with the received model identification information and the particular information, exists among the certain images included in the screen images displayable on the function execution apparatus, acquire certain image identification information for identifying the specific certain image associated with the received model identification information and the particular information; and
transmit the acquired certain image identification information to the function execution apparatus,
wherein the controller of the function execution apparatus is further configured to:
in response to receiving the certain image identification information from the first server after receiving the second operation while the particular information is displayed, terminate the external operation mode; and
in response to terminating the external operation mode, control the display to display the specific screen image including the specific certain image identified by the certain image identification information,
wherein the first server is further configured to:
when the specific certain image, which is associated with the received model identification information and the particular information, does not exist among the certain images included in the screen images displayable on the function execution apparatus, acquire screen image identification information for identifying a second specific screen image of screen images managed by the first server, the second specific screen image including a second specific certain image for instructing the function execution apparatus to execute processing corresponding to the particular information; and
transmit, to the function execution apparatus, a screen image display information for instructing the function execution apparatus to display the second specific screen image based on the screen image identification information,
wherein the controller of the function execution apparatus is further configured to:
in response to receiving the screen image display information from the first server after receiving the second operation while the particular information is displayed, control the display to display the second specific screen image including the second specific certain image in accordance with the received screen image display information, without terminating the external operation mode.

9. A non-transitory computer-readable medium storing computer-readable instructions that are executable by one or more processors coupled with a function execution apparatus comprising:
a communication interface configured to communicate with at least a first server and a second server via a network, the second server being different from the first server;
a display; and
a storage configured to store a plurality of screen images displayable on the display, each screen image including one or more certain images, each certain image being for instructing the function execution apparatus to execute corresponding processing, the instructions being configured to, when executed by the one or more processors, cause the one or more processors to:
  receive an alert from the first server via the communication interface, the alert indicating that there exists particular information to be notified about a newly available function that is provided by the second server, the newly available function being executable by the function execution apparatus;
  in response to receiving the alert, control the display to display a notification object indicating the existence of the particular information;
  receive a first operation of operating the notification object displayed on the display;
  in response to receiving the first operation, receive display information for displaying the particular information from the first server via the communication interface, the display information including the particular information;
  control the display to display the particular information in accordance with the received display information;
  receive a second operation input via the display while the particular information is displayed on the display;
  in response to receiving the second operation, transmit identification information for identifying the particular information to the first server via the communication interface;
  receive screen transition information from the first server via the communication interface; and
  in response to receiving the screen transition information, control the display to display a specific screen image based on the received screen transition information, the specific screen image being one of the plurality of screen images stored in the storage, the specific screen image including a specific certain image for instructing the function execution apparatus to execute processing indicated by the particular information.

10. The non-transitory computer-readable medium according to claim 9,
  wherein the instructions are further configured to, when executed by the one or more processors, cause the one or more processors to:
    receive identification information from the first server via the communication interface, the identification information identifying the specific screen image including the specific certain image; and
    determine the specific screen image including the specific certain image based on the received identification information.

11. The non-transitory computer-readable medium according to claim 10,
  wherein the identification information is to identify the specific certain image.

12. The non-transitory computer-readable medium according to claim 9,
  wherein the plurality of screen images are configured hierarchically, and
  wherein the instructions are further configured to, when executed by the one or more processors, cause the one or more processors to, when the specific screen image is positioned at a lower hierarchical level than a predetermined screen image of the plurality of screen images, control the display to display the specific screen image after sequentially displaying screen images of respective hierarchical levels from the predetermined screen image to the specific screen image.

13. The non-transitory computer-readable medium according to claim 9,
  wherein the plurality of screen images are configured hierarchically, and
  wherein the instructions are further configured to, when executed by the one or more processors, cause the one or more processors to:
    when the specific screen image is not positioned at a lower hierarchical level than a predetermined screen image of the plurality of screen images, control the display to display the specific screen image; and
    when the specific screen image is positioned at a lower hierarchical level than a predetermined screen image of the plurality of screen images, perform:
      controlling the display to display a previous screen image without displaying the specific screen image, the previous screen image being a screen image that was displayed until immediately before the particular information is displayed on the display; and
      thereafter, in response to receipt of an operation for displaying a screen image positioned at a higher hierarchical level than the previous screen, controlling the display to display the specific screen image.

14. The non-transitory computer-readable medium according to claim 9,
  wherein the instructions are further configured to, when executed by the one or more processors, cause the one or more processors to:
    in response to receiving the second operation while the particular information is displayed on the display in a situation where there is not an error caused in the function execution apparatus, control the display to display the specific screen image; and
    in response to receiving the second operation while the particular information is displayed on the display in a situation where there is an error caused in the function execution apparatus, perform:
      controlling the display to display a screen image related to the error without displaying the specific screen image; and
      thereafter, in response to the error being solved, controlling the display to display the specific screen image.

* * * * *